Jan. 12, 1926.  1,569,627
D. M. GOETSCHIUS ET AL
FILTER
Filed August 25, 1922  2 Sheets-Sheet 1
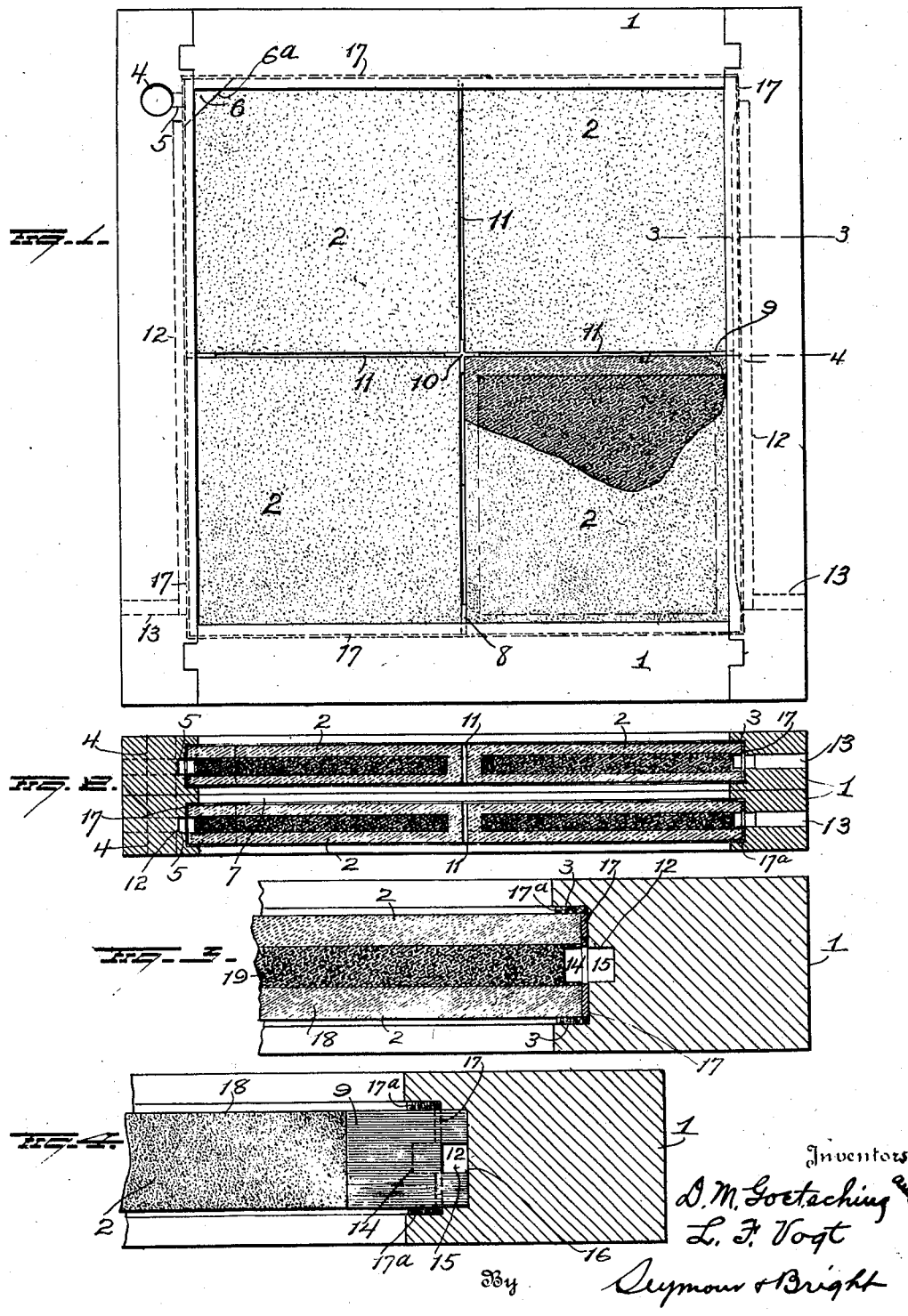

Jan. 12, 1926.  1,569,627
D. M. GOETSCHIUS ET AL
FILTER
Filed August 25, 1922     2 Sheets-Sheet 2
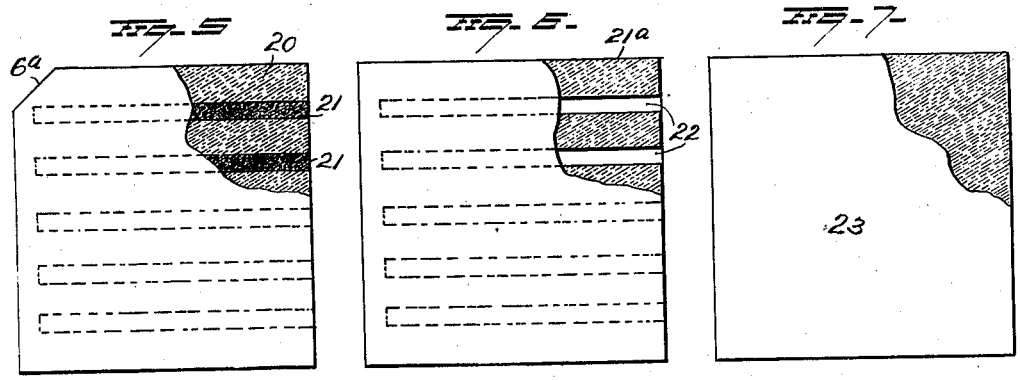
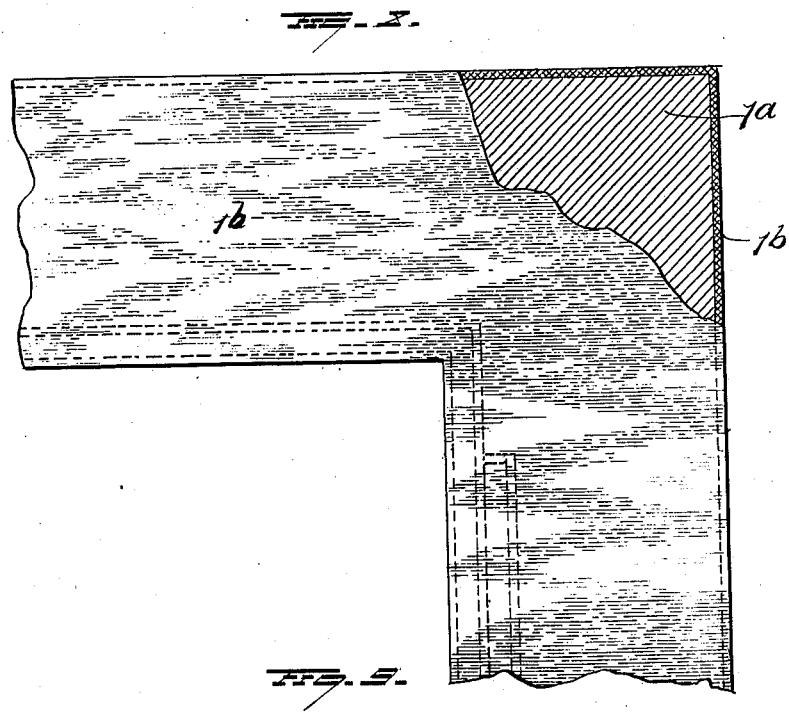
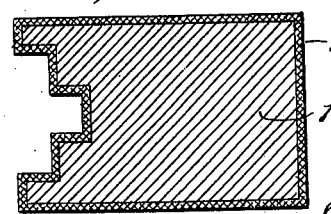

Patented Jan. 12, 1926.

1,569,627

UNITED STATES PATENT OFFICE.

DALTON M. GOETSCHIUS, OF CANONSBURG, AND LOUIS F. VOGT, OF WASHINGTON, PENNSYLVANIA, ASSIGNORS TO STANDARD CHEMICAL COMPANY, OF PITTSBURGH, PENNSYLVANIA.

FILTER.

Application filed August 25, 1922. Serial No. 584,378.

*To all whom it may concern:*

Be it known that we, DALTON M. GOETSCHIUS and LOUIS F. VOGT, citizens of the United States, and residents of Canonsburg and Washington, in the county of Washington and State of Pennsylvania, respectively, have invented certain new and useful Improvements in Filters; and we do hereby declare the following to be a full, clear, and exact description of the invention, such as will enable others skilled in the art to which it appertains to make and use the same.

This invention relates to improvements in filters and more particularly to such as may comprise a plurality of units arranged parallel with each other in a manner more or less similar to the general arrangement of units in a so-called filter press.

One object of our invention is to provide, in a filter intended particularly for use in the separation of solids from an acid or corrosive fluid, filter media of a permanent nature and so assembled in the filter structure as to insure ease and efficiency of operation, and avoid leakage of filtrate between the filter media and the frame in which the same is held, and to prevent leakage of pulp into the filtrate outlet passage.

A further object is to provide a filter having the characteristics above mentioned and which shall obviate necessity for the employment of filter cloths.

A further object is to provide a maximum filtering area and thus enhance the capacity of the filter, and to so construct the filter that labor and repairs shall be reduced to a minimum.

A further object is to provide an acid proof filter press having no filter cloths.

With these and other objects in view, the invention consists in certain novel features of construction and combinations of parts as hereinafter set forth and pointed out in the claims.

In the accompanying drawings; Figure 1 is a view partly in elevation and partly in section showing an embodiment of our invention; Figure 2 is a transverse sectional view representing the association of two units or leaves; Figure 3 is a transverse sectional view on line 3—3 of Figure 1; Figure 4 is a sectional view on the line 4—4 of Figure 1, and Figures 5 to 9 are views illustrating various modifications.

Each unit or leaf of the filter may comprise a frame 1, of non-corrosive and acid proof material, such as wood for example, and a series of filter blocks or stones 2 seated in grooves 3 in the inner sides of the members of said frame. In the embodiment of the invention shown in Figure 1, the frame 1 is shown as being square with four filter blocks or stones located therein, but it will be understood that said frame may have other rectangular configuration, or it may be made circular if so desired, and a greater or less number of filter blocks may be employed within the frame.

Instead of making the frame 1 of such material as wood, metal may be employed, as indicated at $1^a$ Figs. 8 and 9, and provided with an insulating, non-corrosive or acid resisting coating $1^b$. Such coating might be made with rubber, for example, or any suitable acid-proof material might be employed.

Each frame 1 is provided in one of its side members (preferably near the upper left hand corner of the frame) with inlet duct portions 4 so that when a plurality of frames are assembled, a continuous inlet duct will be formed. A lateral duct 5 communicates with each duct portion 4 and the inner ends of these ducts communicate with filling and equalizing ports 6,—the latter being formed by beveling the upper left hand corner portion of each upper left hand block or stone 2, as indicated at $6^a$. The ports 6 communicate with filter chambers 7 formed between the filter blocks or stones of adjacent units or leaves. The filter-blocks or stones of each unit are separated from each other by spacers 8, 9 and 10 of hard rubber or other non-corrosive material, and form additional equalizing ports 11, the said spacers also serving to seal the ends of the ports 11 and also to assist in lending flexibility to the filter structure.

The mixture of liquid and solid to be filtered entering the port 6 of each unit will flow into the filter chambers 7 formed between the stones of two units, and the liquid constituent of said mixture will enter the porous stones; leaving the solid matter in the filter chamber 7, and the liquid or filtrate will finally escape from one vertical edge portion of each stone through vertical outlet passages 12 provided in both side portions of the frame; and at the lower end of each passage 12, a discharge duct 13 for filtrate is provided in the frame.

In the embodiment of our invention as shown in the drawings, the vertical passage 12 for filtrate in each side member of the frame is formed by the cooperation of a vertical groove 14 in one edge of each stone and a groove 15 in the frame,—the groove 14 in each upper stone terminating below the upper edge of said stone and the groove 14 in each lower stone terminating above the lower end of the latter. The spacer 9 between the upper and lower stones of each pair extends across that portion of each outlet passage 12 formed by the grooves 14 in the stones and each spacer 9 extends into the frame member and is provided with a perforation 16 to render continuous that portion of each outlet passage formed by the grooves 15 in the frame side member.

In the operation of the filter, the hydrostatic pressure exerted against the edges of the stone sections by the material entering the equalizing spaces between the four sections presses each section into its grooves in the frame and against gaskets, such as indicated at 17 Fig. 3 with a force approximating one-thousand pounds, thus assisting to seal the joints made by the gaskets. Nearly all parts of the stones being porous, any pulp entering between the stones and the walls of the grooves in the frame in which they are seated will soon have any liquid which it might contain filtered and the solids will remain to choke further passage.

The gasket 17 as shown in Figure 3 serves as a bed to compensate for inequalities between the stone and the frame. If these inequalities are small, the gasket also seals the filtrate outlet or delivery passage or channel against pulp, but we prefer to rely more particularly for sealing the filtrate delivery channel against pulp, upon soft calking 17ª of asbestos wick or other material between edge portions of the faces of the stone sections and the walls of the grooves 3 in the frame. Pressure of pulp against this calking, has a tendency to pack it more tightly in the groove.

In the embodiment of our invention shown in Figures 1, 2 and 3, each filter block or stone 2 comprises outer portions 18 of fine-grain porous stone and an interior portion 19 of coarse grain porous stone, so that liquid, after passing through the fine-grain portions 18 will be subjected to less resistance by the interior coarse-grain stone as it passes to the filtrate discharge passage, and thus the speed of operation as well as the efficiency of the filter will be enhanced. The coarse central portion of the stone may extend throughout approximately the entire interior of the stone and is enclosed on five sides by strata of fine-grain filter stone. That is to say, the fine-grain stone 18 serves as a covering for both faces and three edge portions of the coarse grain interior,—the latter extending completely to one edge of the block or stone so that the filtrate may flow freely into the filtrate passage.

Instead of constructing the filter stone with a continuous coarse-grain interior as illustrated in Figures 1, 2 and 3, we may provide a fine-grain stone 20 with a plurality of bores in which cores 21 of coarse-grain stone may be inserted and made to extend from one edge approximately to the opposite edge of the filter stone, as illustrated in Figure 5.

In some instances we may provide fine-grain filter stones 21ª, with bores forming conducting channels 22 in the same and omit the coarse-grain interior filter cores, as illustrated in Figure 6, or if desired, each filter stone 23 may be made entirely of fine grain stone, as indicated in Figure 7.

Various other changes might be made in the details of construction of our invention without departing from the spirit of the latter or limiting its scope and hence we do not wish to restrict ourselves to the precise details herein set forth.

Having fully described our invention what we claim as new and desire to secure by Letters-Patent, is:—

1. A filter comprising a plurality of units, each unit comprising a frame, and a porous filter stone mounted in said frame, the filter stones of adjacent units being out of contact to form a filter chamber between them, aligned inlet ducts in the several frames filling and equalizing ports communicating with the said inlet ducts and also communicating with the filter chamber between the filter stones of adjacent units, and means communicating through edge portions of said filter stones with the interior thereof to receive and discharge filtrate.

2. A filter comprising a plurality of associated units, each unit comprising a frame and a porous filter stone mounted therein, the filter stones of adjacent units forming a filter chamber between them, a filling and equalizing port formed by marginal portions of the filter stones of said units and communicating with said filter chamber, and means forming an outlet for filtrate, said means communicating with edge portions of stones of the filter units.

3. A filter comprising a plurality of associated units, each unit comprising a frame and superimposed porous filter stone sections mounted therein, one of said stone sections having a beveled edge portion forming a filling and equalizing port, means for conducting liquid containing solids to said port, filter stones of adjacent units disposed to form interposed filter chambers communicating with said filling and equalizing port, and means for receiving filtrate from edge portions of the filter stone sections and discharging the same.

4. In a filter of the character described, a filtering medium comprising a porous stone having a fine grain exterior portion and a coarse-grain interior portion enclosed by said fine-grain exterior portion except at one edge of said stone.

5. In a filter of the character described, the combination of two filter stones forming a filter chamber between them, each of said filter stones comprising a fine-grain body having an interior chamber closed at one end and open at the other, and means forming a discharge for filtrate escaping from the open end of said interior chamber.

6. In a filter of the character described, the combination of a plurality of units, each including a frame and a porous filter stone, the stone of each unit having a beveled corner portion forming with the frame, an equalizing and filling port and stones of adjacent units forming a filter chamber between them communicating with said equalizing and filling port at one side of the unit, each unit having a side discharge passage for filtrate.

7. A filter of the character described, the combination of a plurality of units arranged side by side and each including a frame and a porous filter stone, the filter stones of adjacent units being out of contact to form a filter chamber between them, means for feeding mixed liquids and solids to said filter chamber, and a side member of the frame of each unit having an outlet passage for filtrate from the adjacent porous filter stone.

8. In a filter of the character described, the combination of a plurality of units, arranged side by side and each including a frame and a porous filter stone and the filter stones of adjacent units being out of contact to form a filter chamber between them, means for introducing mixed liquids and solids into said chamber, a side member of the frame of each unit and the edge of the adjacent filter stone having vertical grooves cooperating to form a filtrate discharge passage.

9. In a filter of the character described, the combination of a plurality of units, each comprising a frame and superimposed porous filter stones, the stones of adjacent units forming a filter chamber between them, means for introducing mixed liquids and solids into said chamber, a side member of the frame and the adjacent edges of the filter stones having grooves cooperating to form a filtrate discharge passage, and a spacer separating the superimposed filter stones, said spacer entering the frame and extending across the portion of said passage which is formed by the grooves in the stones and having a perforation in line with that portion of said passage which is formed by the groove in the side member of the frame.

10. In a filter of the character described, a filter unit comprising a frame having a groove extending along its inner edges, a plurality of porous filter stones disposed in said frame and having their edge portions seated in the groove in the inner edges of the frame, gasketing means in said groove for edge portions of the stones, separating devices disposed between adjacent opposed edges of the stones and forming spaces between said stones, and packing means between the faces of edge portions of the stones and the side walls of the groove in the inner edge of the frame.

11. In a filter of the character described, a unit comprising a frame having internally recessed members, a porous stone filter medium disposed in said frame and having edge portions seated in the recessed portions of the frame members, a side member of the frame and the adjacent edge of the stone filter medium having grooves cooperating to form a filtrate discharge passage, and calking between the walls of the recess in said frame member and the respective face portions of the stone filter medium.

12. In a filter of the character described, the combination of a plurality of filter units arranged side by side and each comprising a frame and a plurality of filter stones superposed edgewise within the frame, separating means between edge portions of said stones whereby interposed spaces are formed, the filter stones of adjacent units being out of contact to form a filter chamber between their opposed side faces, means whereby mixed liquid and solid may be fed into said filter chamber, and means whereby filtrate may be discharged from the filter stones.

13. In a filter, the combination of a plurality of units, each comprising a frame and a plurality of filter stone sections therein, the filter stone sections of adjacent units forming a filter chamber between them, inlet means for mixed solids and liquids in each unit and communicating with said filter chamber, and outlet means for filtrate in each vertical side portion of each unit, said outlet means being formed partly in the frame and partly in the adjacent engaged portions of the filter stone sections.

In testimony whereof, we have signed this specification.

DALTON M. GOETSCHIUS.
LOUIS F. VOGT.